US008724621B2

(12) United States Patent
Lin et al.

(10) Patent No.: US 8,724,621 B2
(45) Date of Patent: May 13, 2014

(54) ELECTRONIC APPARATUS AND METHOD FOR SHARING ETHERNET CIRCUIT BETWEEN PLURALITY OF PORTS

(75) Inventors: Chu-Ming Lin, Hsinchu (TW); Chih-Peng Chang, Pao-Chiao (TW)

(73) Assignee: Mediatek Inc., Hsin-Chu (TW)

( * ) Notice: Subject to any disclaimer, the term of this patent is extended or adjusted under 35 U.S.C. 154(b) by 129 days.

(21) Appl. No.: 13/232,717

(22) Filed: Sep. 14, 2011

(65) Prior Publication Data
US 2012/0236852 A1 Sep. 20, 2012

Related U.S. Application Data

(60) Provisional application No. 61/454,082, filed on Mar. 18, 2011, provisional application No. 61/472,386, filed on Apr. 6, 2011.

(51) Int. Cl.
*H04L 12/66* (2006.01)
(52) U.S. Cl.
USPC .......................... 370/352; 370/359; 370/360
(58) Field of Classification Search
USPC .................................. 370/351–360
See application file for complete search history.

(56) References Cited

U.S. PATENT DOCUMENTS

| 6,031,821 | A  | * | 2/2000 | Kalkunte et al. | 370/235 |
| 6,046,982 | A  | * | 4/2000 | Ozveren et al. | 370/232 |
| 7,620,825 | B2 | * | 11/2009 | Camagna et al. | 713/300 |
| 2003/0076846 | A1 | * | 4/2003 | Heinz et al. | 370/404 |
| 2005/0038947 | A1 | * | 2/2005 | Lueck et al. | 710/315 |
| 2009/0201837 | A1 | * | 8/2009 | Diab et al. | 370/276 |

* cited by examiner

*Primary Examiner* — Kerri Rose
(74) *Attorney, Agent, or Firm* — McClure, Qualey & Rodack, LLP

(57) ABSTRACT

The invention provides an electronic apparatus. In one embodiment, the electronic apparatus comprises a plurality of ports, an Ethernet circuit, a port switch, and a flow control scheduler. The Ethernet circuit generates a plurality of transmitted packets according to transmitted data sent from the host, and derives received data sent to a host from a plurality of received packets. The flow control scheduler receives a plurality of transmitting requests corresponding to the ports from the host, arbitrates between the transmitting requests corresponding to the ports to select a transmitting port from the ports, receives a plurality of receiving requests corresponding to the ports from the host, and arbitrates between the plurality of receiving requests corresponding to the ports to select a receiving port from the ports. The port switch sends the transmitted packets to the transmitting port, and receives the received packets from the receiving port.

24 Claims, 12 Drawing Sheets

| Data length | Data content |
|---|---|
| 6 octets | Destination address |
| 6 octets | Source address |
| 2 octets | Length / Type |
| 2 octets | MAC control opcode (0x0001) |
| 2 bytes | MAC control parameters |
| | Received (transmitted as zeros) |

FIG. 5

| Time slot | 0 | 1 | 2 | 3 | 4 | 5 | 6 | 7 | 8 |
|---|---|---|---|---|---|---|---|---|---|
| Tx Grant | Port 1 | Port 1 | Port 1 | Port 2 | Port 2 | Port 2 | Port 2 | Port 2 | Port 1 |
| Rx Grant | Port 1 | Port 2 | Port 2 | Port 2 | Port 2 | Port 1 | Port 1 | Port 1 | Port 1 |

FIG. 6A

| Time slot | 0 | 1 | 2 | 3 | 4 | 5 | 6 | 7 | 8 |
|---|---|---|---|---|---|---|---|---|---|
| Port 1 Tx | Pause Frame | Tx Packet | Tx Packet | Idle | | | | | Tx Packet |
| Port 1 Rx | Rx Packet | Idle | Idle | Idle | Idle | Rx Packet | Rx Packet | Rx Packet | Rx Packet |
| Port 2 Tx | Idle | Idle | Idle | Tx Packet | Pause Frame | Tx Packet | Tx Packet | Tx Packet | |
| Port 2 Rx | Idle | Rx Packet | Rx Packet | Rx Packet | Rx Packet | Idle | Idle | Idle | Idle |

FIG. 6B

ELECTRONIC APPARATUS AND METHOD FOR SHARING ETHERNET CIRCUIT BETWEEN PLURALITY OF PORTS

CROSS REFERENCE TO RELATED APPLICATIONS

This application claims the benefit of U.S. Provisional Application No. 61/454,082, filed on Mar. 18, 2011, and U.S. Provisional Application No. 61/472,386, filed on Apr. 6, 2011, the entireties of which are incorporated by reference herein.

BACKGROUND OF THE INVENTION

1. Field of the Invention

The invention relates to network communications, and more particularly to Ethernet communication circuits.

2. Description of the Related Art

An Ethernet network system comprises at least one port for communication with link partners via Ethernet standard protocols. When the Ethernet network system comprises more than one port, the Ethernet network system is referred to as a multi-port Ethernet network system. Referring to FIG. 1, a block diagram of a conventional multi-port Ethernet network system 100 is shown. The network system 100 comprises a plurality of ports 111~11N, a plurality of Ethernet circuits 121~12N, and a central processing unit (CPU) 150. Each of the Ethernet circuits 121~12N comprises an Ethernet physical layer transceiver and a media access controller. A plurality of link partners are coupled to the Ethernet network system 100 via the ports 111~11N. Each of the ports 111~11N is coupled to one of the Ethernet circuits 121~12N, and the Ethernet circuits 121~12N are couple to the central processing unit 150.

When a link partner sends Ethernet packets to a target port selected from the ports 111~11N, the target port delivers the Ethernet packets to a corresponding Ethernet circuit. The Ethernet circuit then retrieves data from the Ethernet packets and sends the retrieved data to the central processing unit 150. When the central processing unit 150 wants to send data to a link partner, the central processing unit 150 sends the data to a corresponding Ethernet circuit, and the Ethernet circuit generates Ethernet packets according to the data and delivers the Ethernet packets to the corresponding port. The port then sends the Ethernet packets to the link partner.

Because each of the ports 111~11N correspond to one of the Ethernet circuits 121~12N, the Ethernet network system 100 comprises the same number of Ethernet circuits 121~12N as that of the ports 111~11N. The Ethernet circuit 121~12N, however, costs a lot, and the large number of the Ethernet circuits 121~12N further increases the total manufacturing cost of the Ethernet network system 100. To reduce the manufacturing cost of the conventional Ethernet network system 100, a new-type of multi-port Ethernet network system with a low cost is therefore required without degrading the performance of the ports of the Ethernet network system.

BRIEF SUMMARY OF THE INVENTION

The invention provides an electronic apparatus. In one embodiment, the electronic apparatus comprises a plurality of ports, an Ethernet circuit, a port switch, and a flow control scheduler. The Ethernet circuit is coupled to a host, and comprises an Ethernet physical layer transceiver and an Ethernet media access controller, wherein the Ethernet circuit generates a plurality of transmitted packets according to transmitted data sent from the host, and derives received data sent to the host from a plurality of received packets. The flow control scheduler receives a plurality of transmitting requests corresponding to the ports from the host, arbitrates between the transmitting requests corresponding to the ports to select a transmitting port from the ports, receives a plurality of receiving requests corresponding to the ports from the host, and arbitrates between the plurality of receiving requests corresponding to the ports to select a receiving port from the ports. The port switch is coupled between the ports and the Ethernet circuit, and sends the transmitted packets to the transmitting port, and receives the received packets from the receiving port.

The invention also provides a method for sharing an Ethernet circuit between a plurality of ports. In one embodiment, an electronic apparatus comprises the plurality of ports, the Ethernet circuit, a port switch, and a flow control scheduler, and the Ethernet circuit comprises an Ethernet physical layer transceiver and an Ethernet media access controller (MAC). First, a plurality of transmitting requests corresponding to the ports is received from a host by the flow control scheduler. The transmitting requests corresponding to the ports are then arbitrated by the flow control scheduler to select a transmitting port from the ports. A plurality of transmitted packets is then generated by the Ethernet circuit according to transmitted data sent from the host. The transmitted packets are then sent to the transmitting port by the port switch. A plurality of receiving requests corresponding to the ports is then received from the host. The plurality of receiving requests corresponding to the ports are then arbitrated by the flow control scheduler to select a receiving port from the ports. A plurality of received packets is then received from the receiving port by the port switch. Received data sent to the host is then derived from the received packets.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 is a schematic diagram of a format of a pause command;

FIG. 6A is a schematic diagram of an embodiment of the arrangement of transmitting ports and receiving ports in a sequence of time slots;

FIG. 6B is a schematic diagram of data transmission and reception of ports in correspondence to the embodiment of FIG. 6B;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
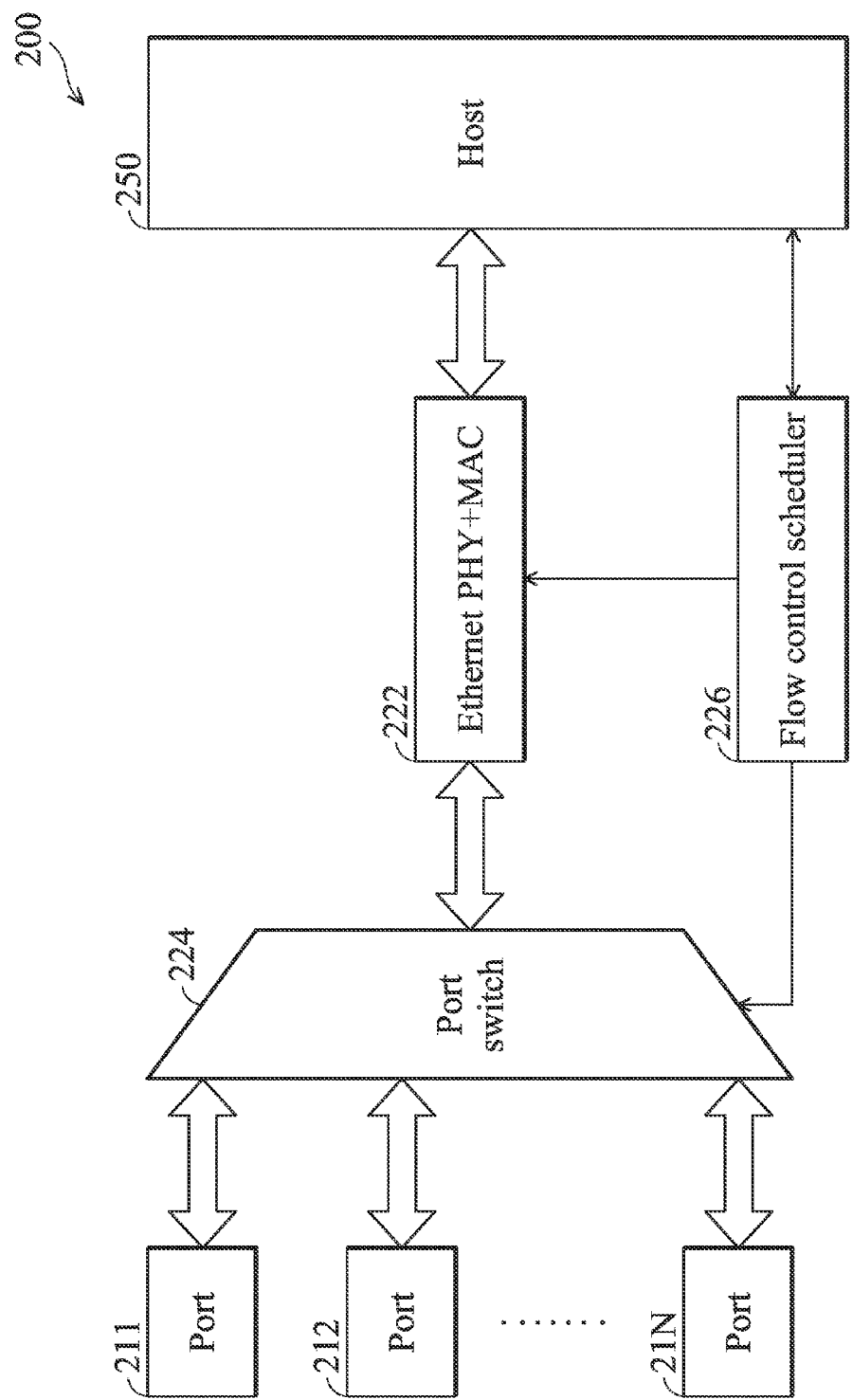
FIG. 2A is a block diagram of an embodiment of an Ethernet network system according to the invention.

Referring to FIG. 2A, a block diagram of an embodiment of an Ethernet network system 200 according to the invention is shown. In one embodiment, the Ethernet network system 200 comprises a plurality of ports 211~21N, a port switch 224, an Ethernet circuit 222, a flow control scheduler 226, and a host 250. In one embodiment, the host 250 is a central processing unit. In another embodiment, the host 250 comprises a CPU and a memory. A plurality of link partners (not shown) are coupled to the Ethernet network system 200 via the ports 211~21N. The link partners support full duplex communications and support the IEEE 802.3x standard or IEEE 802.3az standard. The port switch 224 is coupled between the ports 211~21N and the Ethernet circuit 222. The Ethernet circuit 222 is coupled between the port switch 224 and the host 250. The Ethernet circuit 222 serves to transmit data between the host 250 and the ports 211~21N with a time-sharing mechanism without inducing performance reduction. Bandwidth is dynamically allocated to the ports 211~21N.

The port switch 224 transmits packets to the ports 211~21N and receives packets from the ports 211~21N according to instructions from the flow control scheduler 226. When the host 250 wants to send data to a link partner, the host 250 sends a transmitting request to the flow control scheduler 226. When the flow control scheduler 226 receives a plurality of transmitting requests corresponding to the ports from the host 250, the flow control scheduler 226 arbitrates between the transmitting requests corresponding to the ports to select a transmitting port from the ports 211~21N, and sends a transmitting grant of the transmitting port to the host 250. The host 250 then sends data to be sent to the transmitting port to the Ethernet circuit 222. The Ethernet circuit 222 then generates a plurality of Ethernet packets according to the data, and sends the Ethernet packets to the port switch 224. The port switch 224 then forwards the Ethernet packets from the Ethernet circuit 222 to the transmitting port, and a link partner receives the Ethernet packets from the transmitting port.

Figure 1:
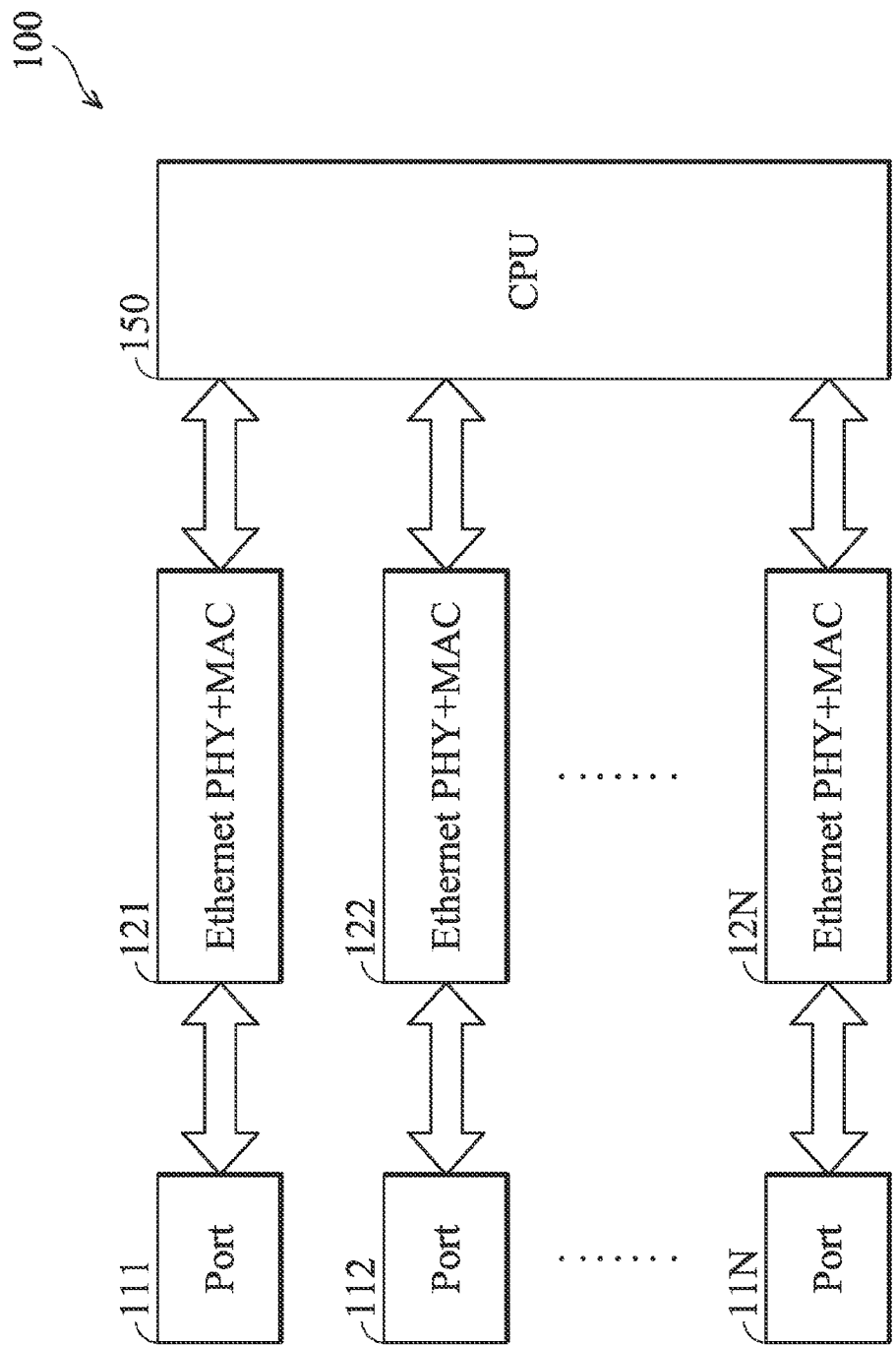
FIG. 1 is a block diagram of a conventional multi-port Ethernet network system.

Similarly, when the host 250 wants to receive data from a link partner, the host 250 sends a receiving request to the flow control scheduler 226. When the flow control scheduler 226 receives a plurality of receiving requests corresponding to the ports from the host 250, the flow control scheduler 226 arbitrates between the plurality of receiving requests corresponding to the ports to select a receiving port from the ports 211~21N, and sends a receiving grant of the receiving port to the host 250. The port switch 224 then receives a plurality of Ethernet packets from the receiving port, and forwards the received packets to the Ethernet circuit 222. The Ethernet circuit 222 then derives data from the Ethernet packets, and sends the Ethernet packets to the host 250. Because there is only one Ethernet circuit 222 in the Ethernet network system 200, the cost of the Ethernet network system 200 is therefore lower than that of the conventional Ethernet network system 100 shown in FIG. 1.

Figure 2B:
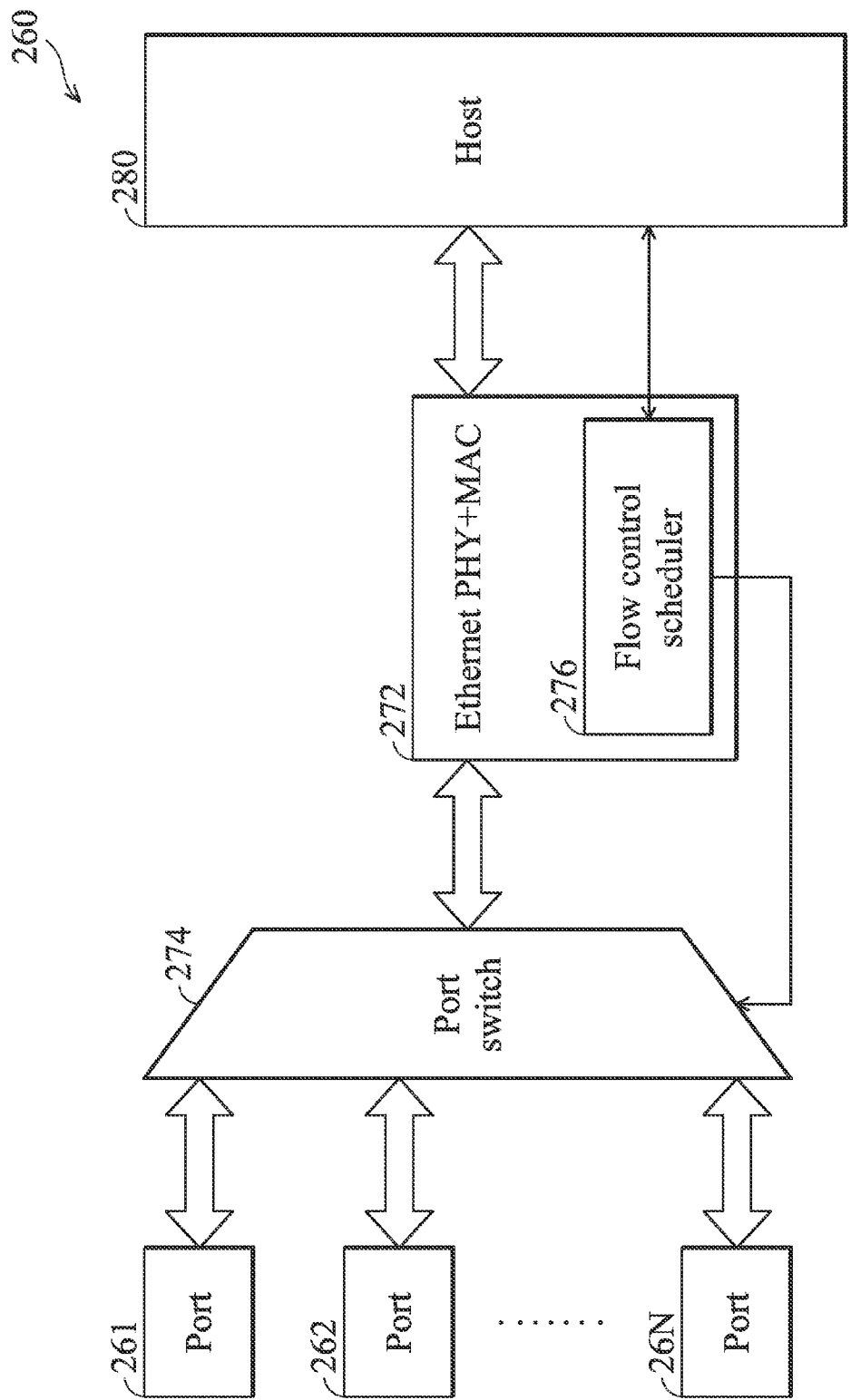
FIG. 2B is a block diagram of another embodiment of an Ethernet network system according to the invention.

The flow control scheduler 226 shown in FIG. 2A is outside of the Ethernet circuit 222. A flow control scheduler, however, may be included by an Ethernet circuit. Referring to FIG. 2B, a block diagram of another embodiment of an Ethernet network system 260 according to the invention is shown. In one embodiment, the Ethernet network system 260 comprises a plurality of ports 261~26N, a port switch 274, an Ethernet circuit 272, and a host 280. Different from the Ethernet circuit 222 shown in FIG. 2A, the Ethernet circuit 272 shown in FIG. 2B comprises a flow control scheduler 276. The circuit design of the Ethernet circuit 272 and the flow control scheduler 276 can therefore be simplified due to combination of the Ethernet circuit 272 and the flow control scheduler 276. All component circuits of the Ethernet network system 260 have the same operations as those of the corresponding component circuits of the Ethernet network system 200 shown in FIG. 2A.

Figure 3:
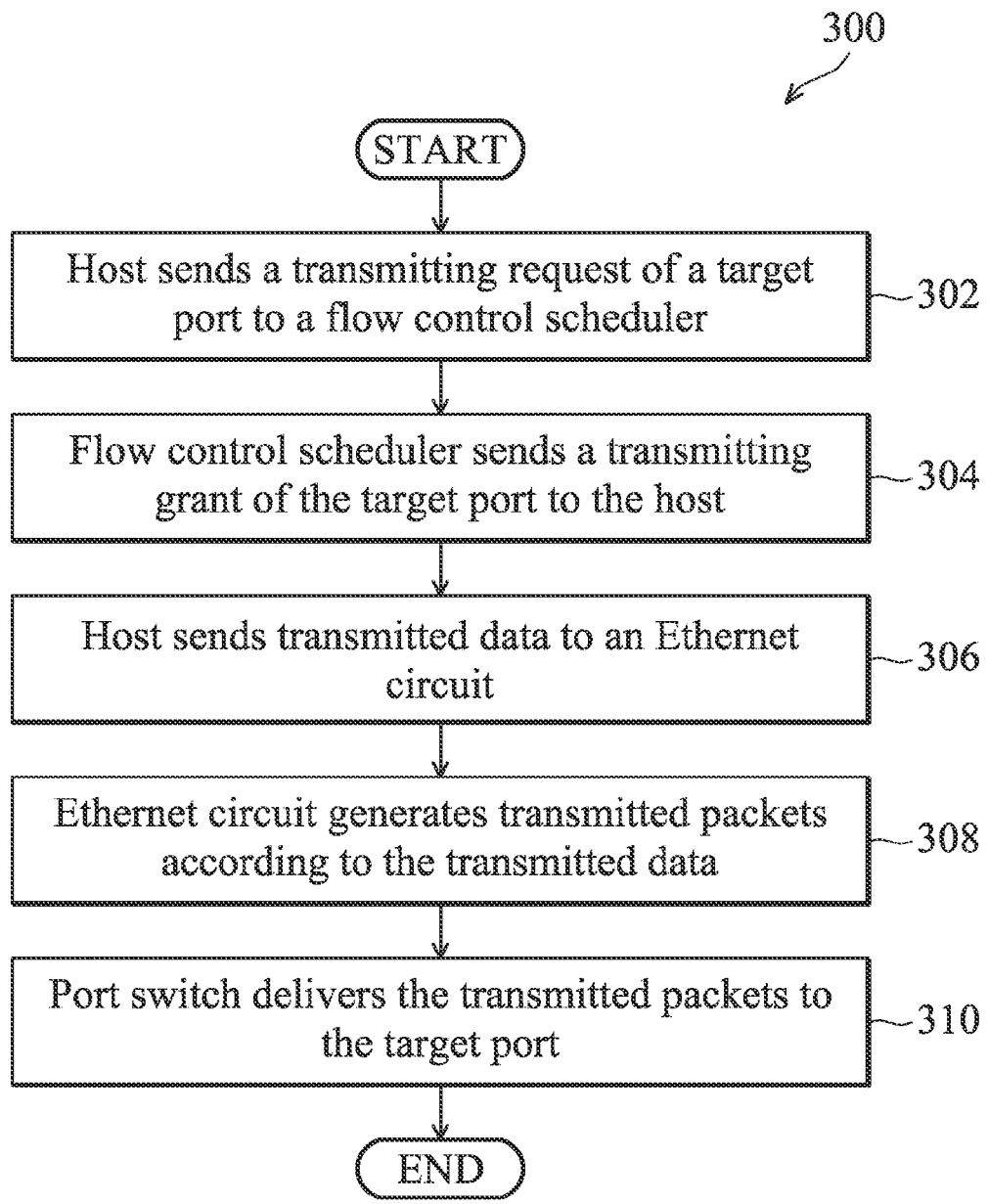
FIG. 3 is a flowchart of a data transmission method based on the IEEE 802.3x standard according to the invention.

Referring to FIG. 3, a flowchart of a data transmission method 300 based on the IEEE 802.3x standard according to the invention is shown. First, the host 250 sends a transmitting request of a target port to the flow control scheduler 226 (step 302). The flow control scheduler 226 then sends a transmitting grant of the target port to the host 250 (step 304), and switches a transmitting port of the port switch 224 to the target port. The host 250 then sends the transmitted data to the Ethernet circuit 222 (step 306), and the Ethernet circuit 222 then generates a plurality of Ethernet packets according to the transmitted data (step 308). The port switch 224 then receives the Ethernet packets from the Ethernet circuit 222 and sends the Ethernet packets to the target port (step 310). A link partner then receives the Ethernet packets from the target port.

Figure 4:
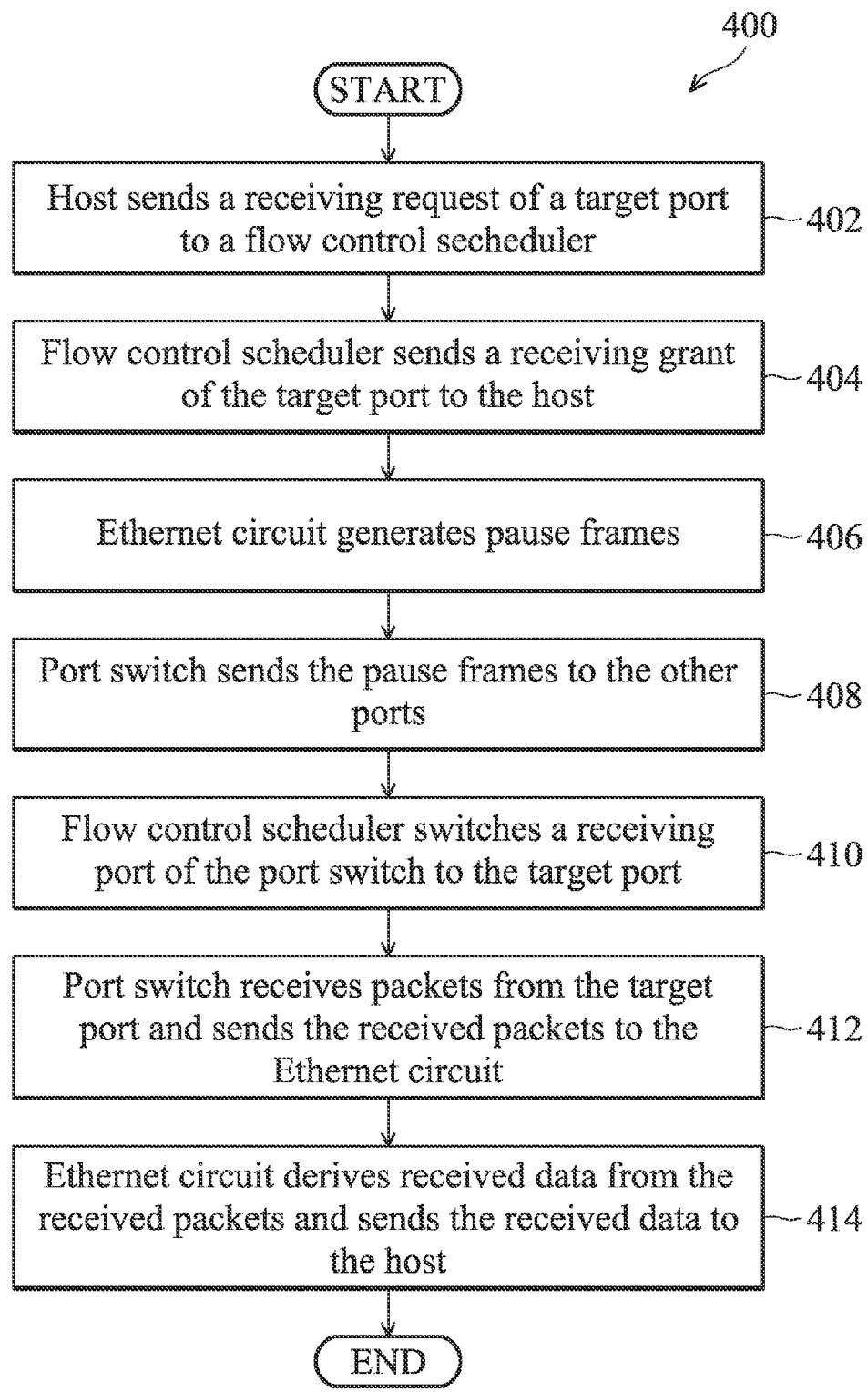
FIG. 4 is a flowchart of a data receiving method based on the IEEE 802.3x standard according to the invention.

Referring to FIG. 4, a flowchart of a data receiving method 400 based on the IEEE 802.3x standard according to the invention is shown. First, the host 250 sends a receiving request of a target port to the flow control scheduler 226 (step 402). The flow control scheduler 226 then sends a receiving grant of the target port to the host 250 (step 404). In one embodiment, before packets are received from the target port, the Ethernet circuit 222 generates a plurality of pause frames (step 222), and the port switch 224 respectively sends the pause frames to all the ports 211~21N except for the target ports (step 408). The pause frames comprise pause commands of the IEEE 802.3x standard to prevent corresponding link partners from sending packets to corresponding ports. Referring to FIG. 5, a schematic diagram of a format of a pause command is shown. In one embodiment, the pause command comprise 6 octets of a destination address, 6 octets of a source address, 2 octets of a length/type information, 2 octets of a MAC control opcode of 0x0001, and 2 bytes of a pausing time calculated in a unit of 512 bit-time. The flow control scheduler 226 then switches a receiving port of the port switch 224 to the target port (step 410). The port switch 224 then receives Ethernet packets from the target port, and sends the received packets to the Ethernet circuit 222 (step 412). The Ethernet circuit 222 then derives data from the received packets and then sends the data to the host 250 (step 414).

The flow control scheduler 226 dynamically allocate the network bandwidth to the ports 211~21N in a time sharing method. A time period is divided into a plurality of time slots. In a specific time slot, the flow control scheduler 226 only permits one port (referred to as the transmitting port) to send data to a corresponding link partner. Similarly, the flow control scheduler 226 only permits one port (referred to as the receiving port) to receive data from a corresponding link partner. Referring to FIG. 6A, a schematic diagram of an embodiment of the arrangement of transmitting ports and receiving ports in a sequence of time slots 0~8 is shown. In the time slots 0~2 and 8, the transmitting port is a port 1. In the time slots 3~7, the transmitting port is a port 2. In the time slots 0 and 5~8, the receiving port is the port 1. In the time slots 1~4, the receiving port is the port 2.

Referring to FIG. 6B, a schematic diagram of data transmission and reception of ports 1 and 2 corresponding to the embodiment of FIG. 6B is shown. In the time slot 0, the transmitting port and the receiving port are both the port 1. Because the receiving port is changed from the port 1 to the port 2 in the subsequent time slots 1~4, a pause frame is sent to the port 1 in the time slot 0 to prevent a link partner from sending packets to the port 1 during the time slots 1~4. In the time slot 4, the transmitting port and the receiving port are both the port 2. Because the receiving port is changed from the port 2 to the port 1 in subsequent time slots 5~8, a pause frame is sent to the port 2 in the time slot 4 to prevent a link partner from sending packets to the port 2 during the time slots 5~8.

Figure 7:
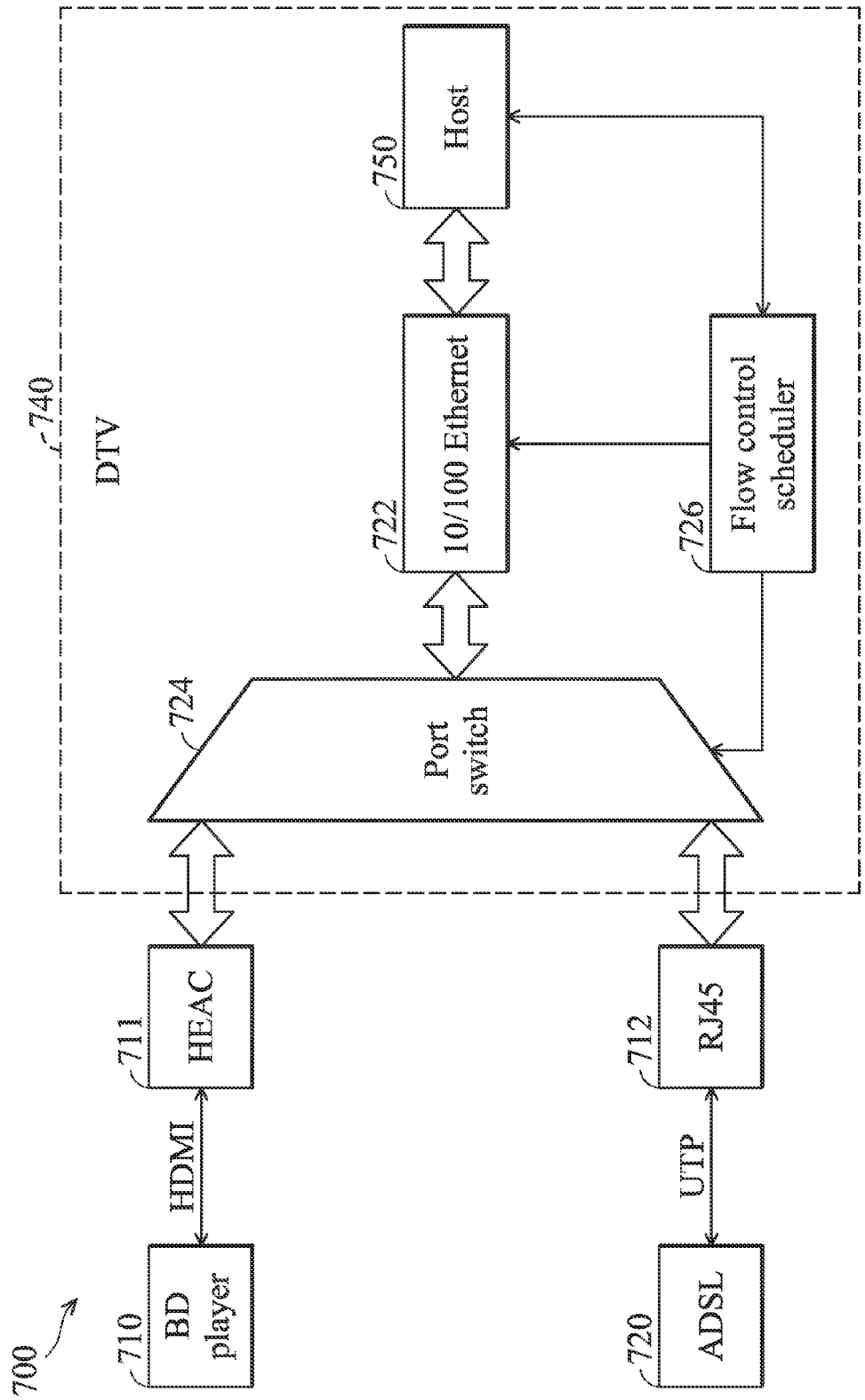
FIG. 7 is a block diagram of an embodiment of an Ethernet network system according to the invention.

In one embodiment, the Ethernet network system 200 may be consumer equipment, such as a digital television system or a blu-ray disk player. Referring to FIG. 7, a block diagram of an embodiment of an Ethernet network system 740 according to the invention is shown. The Ethernet network system 740 is a digital television system and comprises an HDMI Ethernet & Audio return Channel (HEAC) port 711 and an RJ45 port 712. A blu-ray disk player 710 is connected to the digital television system 740 via the HEAC port 711, and an ADSL modem 720 is connected to the digital television system 740 via the RJ45 port 712. The blu-ray disk player 710 and the ADSL modem 720 share the Ethernet circuit 722 to communicate with a host 750 of the digital television system 740. The digital television system 740 can therefore access a network via the ADSL modem 720, and can also access video data played by the blu-ray disk player 710.

Figure 8:
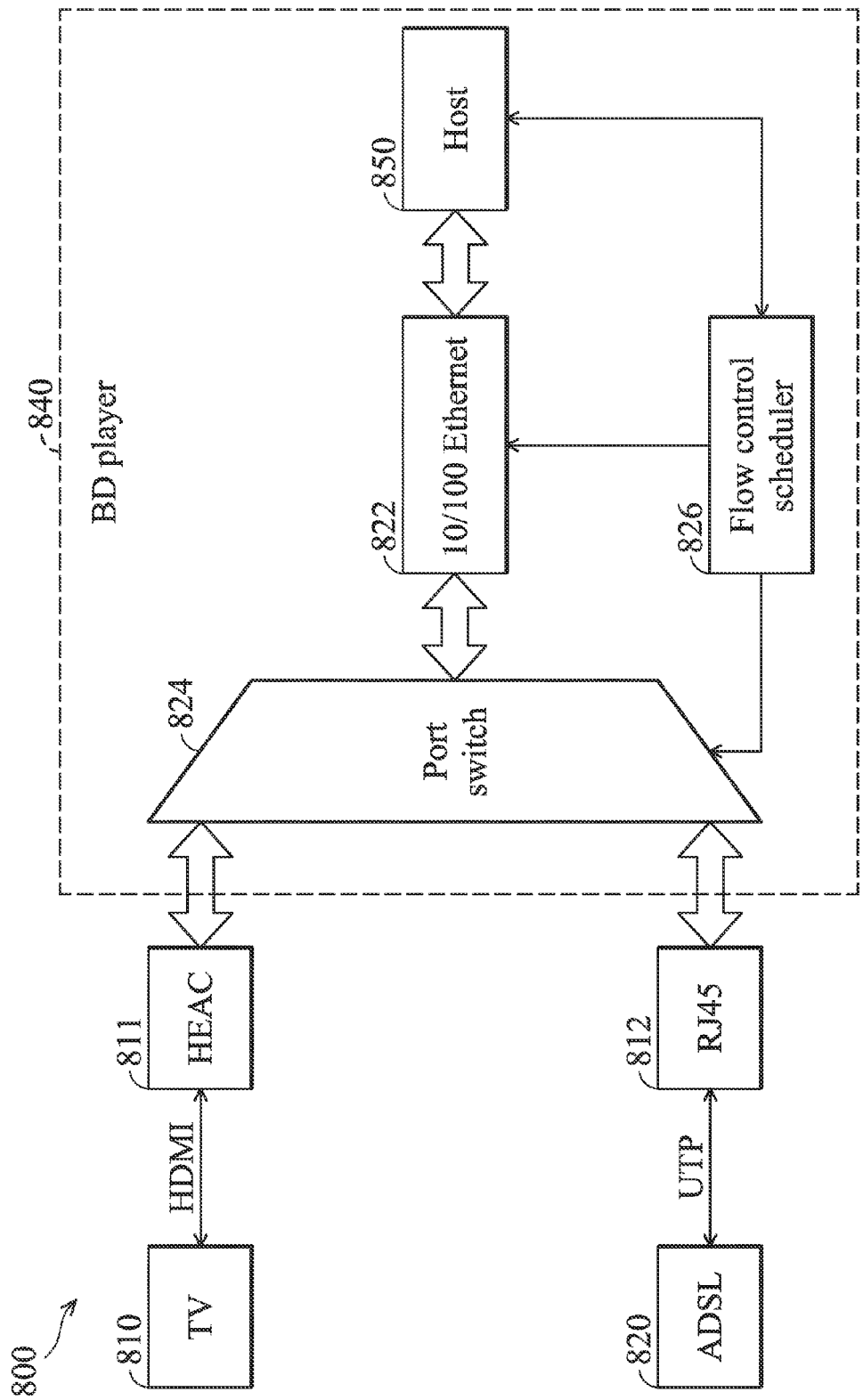
FIG. 8 is a block diagram of another embodiment of an Ethernet network system 740 according to the invention.

Referring to FIG. 8, a block diagram of another embodiment of an Ethernet network system 840 according to the invention is shown. The Ethernet network system 840 is a blu-ray disk player and comprises an HDMI Ethernet & Audio return Channel (HEAC) port 811 and an RJ45 port 812. A digital television system 810 is connected to the blu-ray disk player 840 via the HEAC port 811, and an ADSL modem 720 is connected to the blu-ray disk player 840 via the RJ45 port 812. The digital television system 810 and the ADSL modem 820 share the Ethernet circuit 822 to communicate with a host 850 of the blu-ray disk player 840. The blu-ray disk player 840 can therefore access a network via the ADSL modem 820, and can also show video data on a screen of the digital television system 810.

Figure 9:
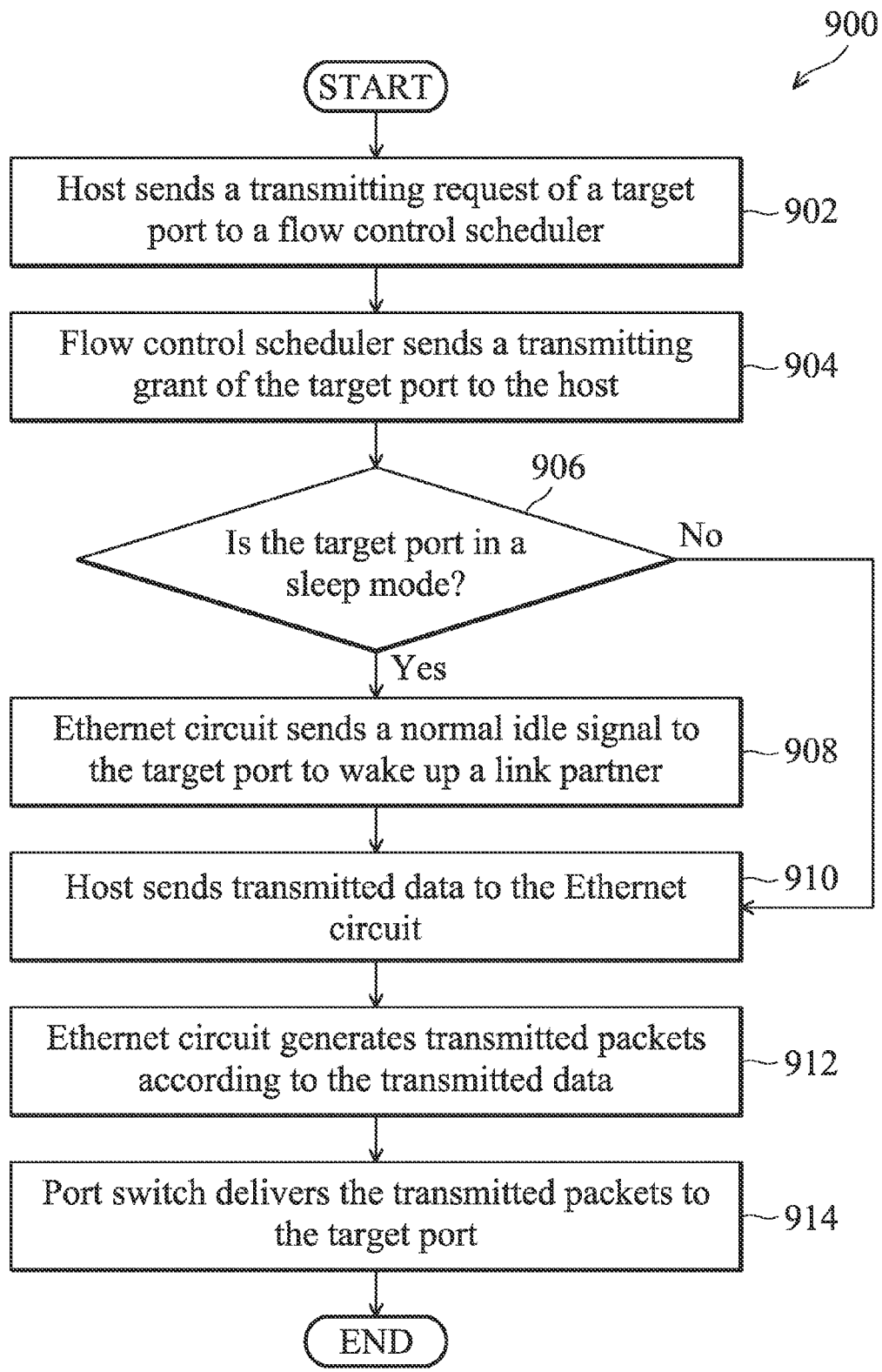
FIG. 9 is a flowchart of a data transmission method based on the IEEE 802.3az standard according to the invention.

In one embodiment, the link partners coupled to the ports 211~21N support the IEEE 802.3az standard. The Ethernet network system 200 therefore further comprises a scheduler circuit (not shown in FIG. 2) for dynamically arranging bandwidths of the ports 211~21N. Referring to FIG. 9, a flowchart of a data transmission method 900 based on the IEEE 802.3az standard according to the invention is shown. First, the host 250 sends a transmitting request of a target port to the flow control scheduler 226 (step 3902). The flow control scheduler 226 then sends a transmitting grant of the target port to the host 250 (step 904), and switches a transmitting port of the port switch 224 to the target port. Whether the target port is in a sleep mode is then determined (step 906). If so, the Ethernet circuit 222 sends a normal idle signal to the target port to wake up the link partner connected to the target port (step 908). The host 250 then sends the transmitted data to the Ethernet circuit 222 (step 910), and the Ethernet circuit 222 then generates a plurality of Ethernet packets according to the transmitted data (step 912). The port switch 224 then receives the Ethernet packets from the Ethernet circuit 222 and sends the Ethernet packets to the target port (step 914). The link partner then receives the Ethernet packets from the target port.

Figure 10:
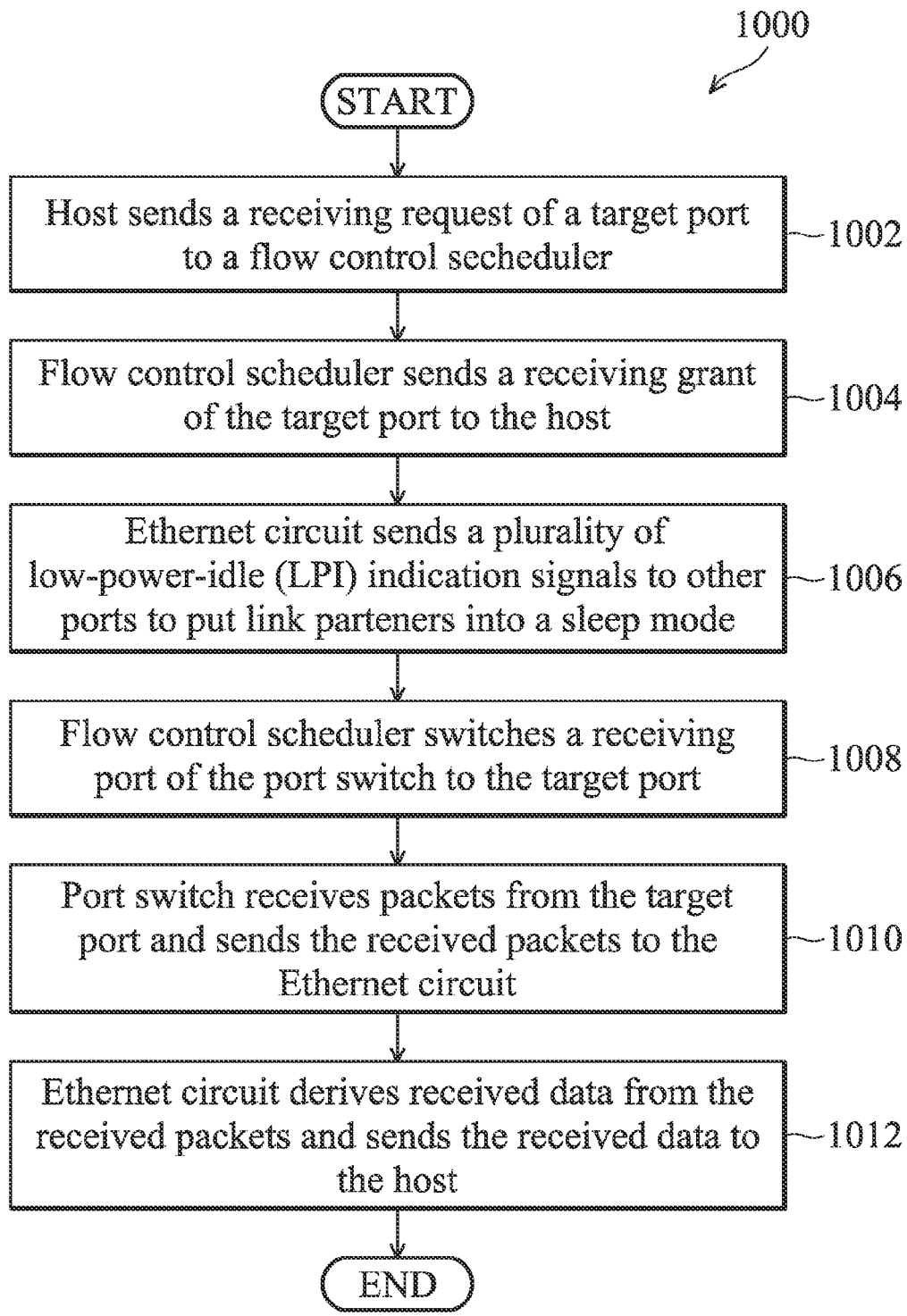
FIG. 10 is a flowchart of a data receiving method based on the IEEE 802.3az standard according to the invention.

Referring to FIG. 10, a flowchart of a data receiving method 1000 based on the IEEE 802.3az standard according to the invention is shown. First, the host 250 sends a receiving request of a target port to the flow control scheduler 226 (step 1002). The flow control scheduler 226 then sends a receiving grant of the target port to the host 250 (step 1004). Before packets are received from the target port, the Ethernet circuit 222 respectively sends a plurality of low-power-idle (LPI) indication signals to all the ports 211~21N except for the target port to put the link partners connected to the ports into a sleep mode (step 1006). The flow control scheduler 226 then switches a receiving port of the port switch 224 to the target port (step 1008). The port switch 224 then receives Ethernet packets from the target port, and sends the received packets to the Ethernet circuit 222 (step 1010). The Ethernet circuit 222 then derives data from the received packets and then sends the data to the host 250 (step 1012).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus, comprising:
a plurality of ports;
an Ethernet circuit, coupled to a host, comprising an Ethernet physical layer transceiver and an Ethernet media access controller (MAC), generating a plurality of transmitted packets according to transmitted data sent from the host, and deriving received data sent to the host from a plurality of received packets;
a flow control scheduler for selecting a port from the ports based on a data transmission requirement or a data reception requirement; and
a port switch, coupled between the ports and the Ethernet circuit, sending the transmitted packets to the transmitting port, and receiving the received packets from the receiving port, wherein a number of the ports is more than a number of the Ethernet physical layer transceiver.

2. The electronic apparatus as claimed in claim 1, wherein after the flow control scheduler selects the transmitting port, the flow control scheduler sends a transmitting grant corresponding to the transmitting port to the host, and after the flow control scheduler selects the receiving port, the flow control scheduler sends a receiving grant corresponding to the receiving port to the host.

3. The electronic apparatus as claimed in claim 1, wherein after the flow control scheduler determines the receiving port, the Ethernet circuit generates a plurality of pause frames comprising pause commands of the IEEE 802.3x standard, and the port switch sends the pause frames to the ports except for the receiving port to suspend data transmitting from the ports.

4. The electronic apparatus as claimed in claim 3, wherein the pause frames comprise 6 octets of a destination address, 6 octets of a source address, 2 octets of a MAC control opcode of 0x0001, and 2 bytes of a pausing time.

5. The electronic apparatus as claimed in claim 1, wherein after the flow control scheduler selects the receiving port, the Ethernet circuit generates a plurality of low-power-idle (LPI) indication signals of the IEEE 802.3az standard, and the port switch sends the LPI indication signals to the ports except for the receiving port to put the ports into a sleep mode.

6. The electronic apparatus as claimed in claim 5, wherein after the flow control scheduler selects the transmitting port, if the transmitting port is in the sleep mode, the Ethernet circuit generates a normal idle signal of the IEEE 802.3az standard, and the port switch sends the normal idle signal to the transmitting port to wake up the transmitting port from the sleep mode.

7. The electronic apparatus as claimed in claim 1, wherein the electronic apparatus further comprises a scheduler circuit for dynamically arranging bandwidths of the ports.

8. The electronic apparatus as claimed in claim 1, wherein a plurality of link partners are respectively connected to the electronic apparatus via the ports, and the link partners support the IEEE 802.3x standard or IEEE 802.3az standard for connection with the electronic apparatus.

9. The electronic apparatus as claimed in claim 8, wherein the electronic apparatus is a digital television system, and one of the link partners is a blu-ray disk player, and another one of the link partners is an ADSL modem.

10. The electronic apparatus as claimed in claim 8, wherein the electronic apparatus is a blu-ray disk player, and one of the link partners is a digital television system, and another one of the link partners is an ADSL modem.

11. The electronic apparatus as claimed in claim 8, wherein the digital television system comprises an HEAC port and an RJ45 port, and the blu-ray disk player is connected to the digital television system by the HEAC port, and the ADSL modem is connected to the digital television system by the RJ4 port.

12. The electronic apparatus as claimed in claim 1, wherein the host is a central processing unit or comprises the central processing unit and a memory.

13. A method for sharing an Ethernet circuit between a plurality of ports, wherein an electronic apparatus comprises the plurality of ports, the Ethernet circuit, a port switch, and a flow control scheduler, and the Ethernet circuit comprises an Ethernet physical layer transceiver and an Ethernet media access controller (MAC), comprising:
 receiving a plurality of transmitting requests corresponding to the ports by the flow control scheduler;
 arbitrating between the transmitting requests corresponding to the ports by the flow control scheduler to select a transmitting port from the ports;
 generating a plurality of transmitted packets by the Ethernet circuit according to transmitted data sent from a host;
 sending the transmitted packets to the transmitting port by the port switch;
 receiving a plurality of receiving requests corresponding to the ports;
 arbitrating between the plurality of receiving requests corresponding to the ports by the flow control scheduler to select a receiving port from the ports;
 receiving a plurality of received packets from the receiving port by the port switch; and
 deriving received data sent to the host from the received packets, wherein a number of the ports is more than a number of the Ethernet physical layer transceiver.

14. The method as claimed in claim 13, further comprising:
 after the transmitting port is selected, sending a transmitting grant corresponding to the transmitting port to the host by the flow control scheduler; and
 after the receiving port is selected, sending a receiving grant corresponding to the receiving port to the host by the flow control scheduler.

15. The method as claimed in claim 13, further comprising:
 after the receiving port is selected, generating a plurality of pause frames comprising pause commands of the IEEE 802.3x standard by the Ethernet circuit; and
 sending the pause frames to the ports except for the receiving port by the port switch to suspend data transmitting from the ports.

16. The method as claimed in claim 15, wherein the pause frames comprise 6 octets of a destination address, 6 octets of a source address, 2 octets of a MAC control opcode of 0x0001, and 2 bytes of a pausing time.

17. The method as claimed in claim 13, further comprising:
 after the receiving port is selected, generating a plurality of low-power-idle (LPI) indication signals of the IEEE 802.3az standard by the Ethernet circuit; and
 sending the LPI indication signals to the ports except for the receiving port by the port switch to put the ports into a sleep mode.

18. The method as claimed in claim 17, further comprising:
 after the transmitting port is selected, if the transmitting port is in the sleep mode, generating a normal idle signal of the IEEE 802.3az standard by the Ethernet circuit; and
 sending the normal idle signal to the transmitting port by the port switch to wake up the transmitting port from the sleep mode.

19. The electronic apparatus as claimed in claim 13, wherein the electronic apparatus further comprises a scheduler circuit for dynamically arranging bandwidths of the ports.

20. The method as claimed in claim 13, wherein a plurality of link partners are respectively connected to the electronic apparatus via the ports, and the link partners support the IEEE 802.3x standard or IEEE 802.3az standard for connection with the electronic apparatus.

21. The method as claimed in claim 20, wherein the electronic apparatus is a digital television system, and one of the link partners is a blu-ray disk player, and another one of the link partners is an ADSL modem.

22. The method as claimed in claim 21, wherein the digital television system comprises an HEAC port and an RJ45 port, and the blu-ray disk player is connected to the digital television system by the HEAC port, and the ADSL modem is connected to the digital television system by the RJ4 port.

23. The method as claimed in claim 20, wherein the electronic apparatus is a blu-ray disk player, and one of the link partners is a digital television system, and another one of the link partners is an ADSL modem.

24. The method as claimed in claim 13, wherein the host is a central processing unit or comprises the central processing unit and a memory.

\* \* \* \* \*